UNITED STATES PATENT OFFICE.

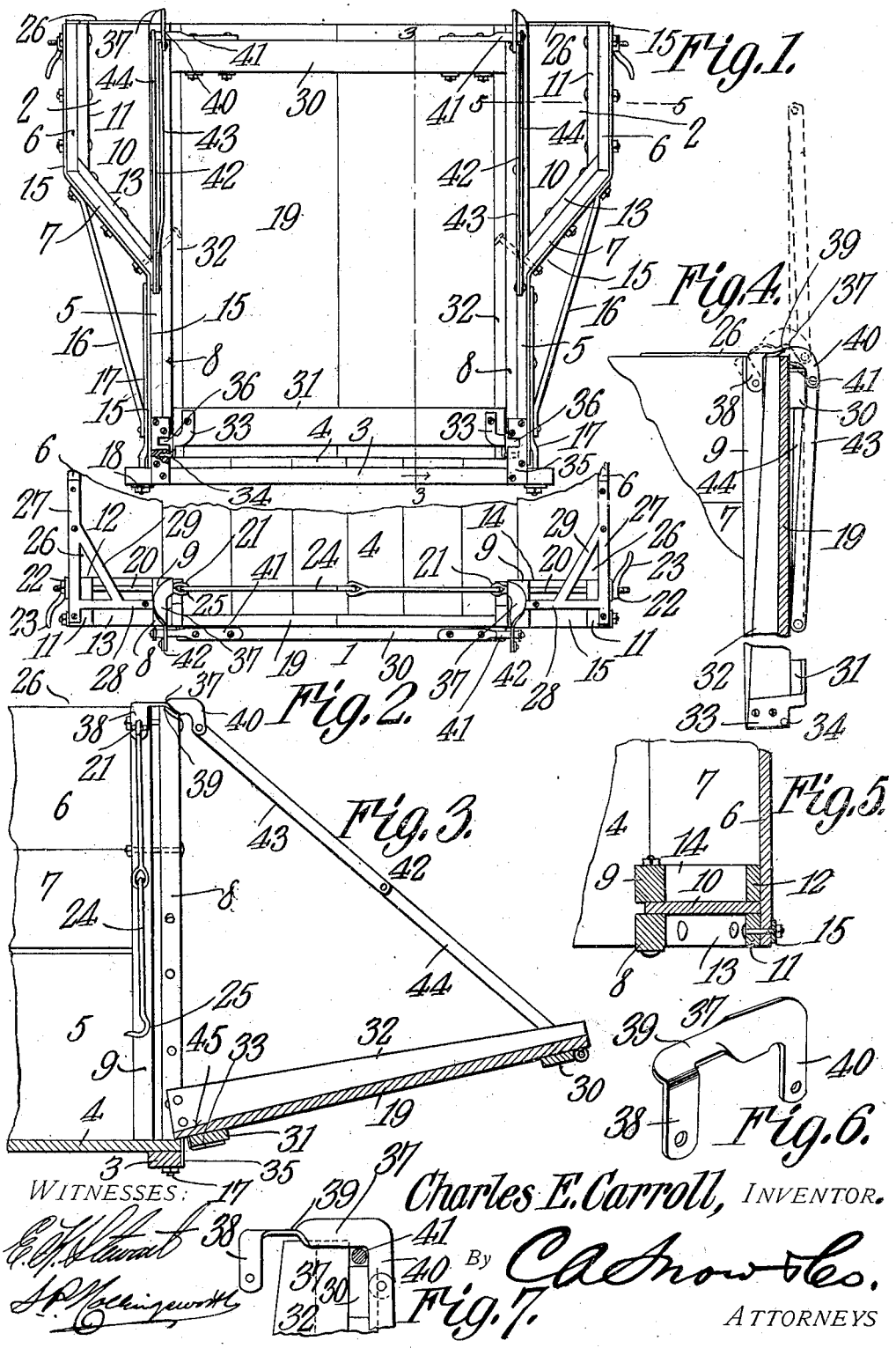

CHARLES E. CARROLL, OF HAMLER, OHIO.

END-GATE FOR WAGONS.

No. 889,295.            Specification of Letters Patent.            Patented June 2, 1908.

Application filed April 26, 1907. Serial No. 370,426.

*To all whom it may concern:*

Be it known that I, CHARLES E. CARROLL, a citizen of the United States, residing at Hamler, in the county of Henry and State of Ohio, have invented a new and useful End-Gate for Wagons, of which the following is a specification.

This invention relates to an improvement in wagons, especially to an end gate therefor which is adapted to close the rear end of a wagon, and, when desired, to be turned down and serve as a shovel board.

The main object of the invention is to provide an end gate, pivotally attached at its lower end to the framing of a wagon and when needed, to be swung down and serve as a shovel board. The free end of the end gate is supported when open by a divided brace on each side, pivoted together centrally; and in connection with a fulcrum plate, they perform the function of locking the end gate in place when folded up to close the rear of the wagon.

Another object of the invention pertains to the overhanging sides of the wagon, their construction and bracing means.

A further object has reference to the folding braces and the manner in which they lock the end gate in closed position.

With these and other novel objects, the invention consists in certain construction and combination of parts hereinafter described and claimed.

In the accompanying drawing: Figure 1 is a rear elevation of a wagon body with the invention attached thereto, the end gate being closed. Fig. 2 is a plan view of the rear end of the wagon arranged as in Fig. 1. Fig. 3 is a vertical sectional view of Fig. 1 on the line 3—3, the end gate lowered and in position to serve as a shovel board. Fig. 4 is a fragmentary sectional view similar to Fig. 3 with the end gate in closed position. Fig. 5 is a horizontal sectional view, on the line 5—5 of Fig. 1. Fig. 6 is a perspective view of a detail part. Fig. 7 is a sectional detail view of the end gate lock.

Similar numerals of reference indicate the same parts in all the figures.

The numeral 1 indicates a wagon body of well-known type in which the upper half of the body is made wider than the lower half, forming thereby an overhang 2 on each side. Extending across the wagon body on its under side are cross beams 3, only one of which is shown. Bolted to the cross beams 3 is the bottom or floor 4 of the wagon. Rising vertically from the wagon floor 4 are the sides 5 of the narrow or lower half of the wagon. The sides of the overhang 2 and the inclined boards forming the bottom of the overhang are numbered respectively 6 and 7. Extending upwardly from the bottom of the wagon to its top and at its rear end are two parallel uprights 8 and 9 on each side of the wagon to which the sides 5 are bolted. The uprights 8 are in rear of the uprights 9 and separated sufficiently far to receive the rear boards 10 of the overhang 2, (see Fig. 5). Against the rear sides of the boards 10 lie short uprights 11 bolted to the sides 6 of the two overhangs 2. Similar uprights 12 are placed against the sides 6 and the forward faces of the end boards 10. Braces 13 and 14 lie above each inclined bottom board 7 to which braces 13 said inclined boards are secured by bolts. An iron strap 15 is attached to the extreme rear end of each side 5, 6 and inclined bottom 7 by the securing bolts heretofore mentioned, and firmly hold said parts in their relative positions. An additional means of support for each overhang 2 is furnished by a brace rod 16 riveted or bolted to the strap 15 at the upper end of its inclined portion and to a tie bar 17 near the bottom of the wagon. The tie bar 17 is riveted or bolted to the strap 15 at its lower end and from thence it extends through the cross beam 3 to receive a fastening nut 18. At each corner of the wagon is a brace plate 26, one arm 27 of which is firmly screwed to the top of the side 6 and the other 28 to the top edge of the end board 10. A stiffening connection 29 extends between the two arms. While but one set of the bracing members 15 and 17 have been described, their number may be increased as the size of the vehicle and the load it has to carry warrants.

To prevent the sides of the wagon from spreading at the rear and thus leave spaces between the uprights 8 and 9 and each side edge of the end gate 19, a rod 20 extends horizontally through the uprights 9, 12 and the side 6 on each side of the wagon near the top of the overhang 2. An eye 21 is formed on each rod 20 near the upright 9, and a screw thread on the end projecting through the side 6 which end carries a nut 22 provided with a handle 23 for turning it. Suspended from one of the eyes 21 is a plurality of linked bars 24 terminating in a hook 25, which, when the wagon is loaded, is connected to the other eye 21. Now by turning the nuts 22 the sides of the wagon are drawn together and the uprights 8 and 9 caused to bear firmly against the side edges of the end gate 19.

The end gate 19 is made, as here shown, of a plurality of sections firmly fastened together by upper and lower cross beams 30 and 31. On each edge of the end gate 19 is a perpendicular strip 32 wider than the thickness of the end gate and tapered from end to end, its greatest width being at the bottom, at which point a plate 33 is securely fastened to each strip 32 and bent around to the rear where it is bolted to the cross beam 31. Projecting laterally from each plate 33 is a stud 34 which serves as a hinge pin for the end gate. On the rear of the wagon body 1 at the bottom thereof and on each side of the end gate 19 is a fixed plate 35 having a notch 36 in its inner edge a short distance above the bottom 4 of the wagon. The uprights 8 are cut away behind the plates to permit the stud 34 when placed in the notches 36 to drop behind the plates and serve as pintles for the end gate as it is raised and lowered.

Pivoted to each rod 20 between the eye 21 and upright 9 is a hinge plate or lever 37 which may be divided for description into three parts, viz: a vertical part 38 extending from the rod 20, which serves as a pivot, to the top of the wagon; a horizontal part 39 reaching from the vertical part over the uprights 8 and 9 to a short distance in rear of the upright 8 and finally bending downwardly at 40 perpendicular to the horizontal part and of substantially the same length as the part 38. Bolted to the upper edge of the cross beam 30 are two hinge bars 41 projecting laterally from each end of the end gate and slightly beyond the levers 37. Between each lever 37 and one of the hinge bars 41 is a jointed brace 42 formed of two strips 43 and 44 hinged together, to the lever 37 and hinge bar 41.

When the end gate 19 is lowered as in Fig. 3, its upper or outer end will be higher than its lower or inner end, thus placing it at an angle to the bottom of the wagon. The lower or inner end is chamfered at 45 to permit easy shoveling from the wagon to the end gate, or, as it is called when in this position, a shovel board. The weight on the outer end of the shovel board is sustained by the jointed braces 42 which in this position are straightened out, the two strips 43 and 44 of each brace being in a straight line and pulling downwardly on the hinge plate or lever 37 to which it is connected, and the hinge plate or lever in turn pressing on the upper ends of the standards 8 and 9. The shovel board is thus assured a firm and efficient support.

The shovel board or end gate 19 is closed and locked by the following means. The extreme end is lifted and the side braces 42 are caused to flex upwardly at the joint between the strips 43 and 44. As the end gate moves towards the closed position, the joints in the braces continue to rise until the end gate is finally seated between the supports 8 and 9, the hinge bars 41 limiting the inward movement by striking the standards 8. The strips 43 and 44 of the braces 42 will at this time be in a vertical position and side by side, their pivoted connections being uppermost (see dotted lines in Fig. 4), and as the strips 43 are shorter than strips 44, the hinge plates or levers 37 will be raised so that the hinge bars 41 may pass beneath them when the end gate is closed. From the upright position of the folded braces 42 they are turned downwardly against the end gate as represented in Figs. 1, 2 and 4, the hinge plates 37 descending with the strips so that the downwardly extending part 40 thereof will overlie the hinge bars 41 and securely lock the end gate in closed position. The hooked end of the linked bars will then be placed in the idle eye 21 and if the vehicle is loaded, the nuts 22 are turned to hold the rear end of the sides from spreading. In unloading, the nuts are loosened, the linked bars are unhooked and hang down on one side against the standard 9 as represented in Fig. 3.

When it is desired to dump the contents of the wagon, the end gate in its closed position is lifted vertically until the studs 34 are opposite the notches 36, the bottom of the end gate is then drawn outwardly, disengaging the studs and permitting the end gate to swing from the pivotal connections at its upper end; these connections being the hinged plates or levers 37 on the vehicle, hinged bars 41 on the end gate and the folded braces 42 connecting them. When the front end of the vehicle body is raised the contents of the wagon strikes the end gate and causes it to swing open. By reversing the movements, the end gate is closed.

Having thus described the invention, what is claimed is:—

1. An end-gate removably hinged at its lower end to a wagon body, a hinge plate or lever fulcrumed at the top of the wagon body on each side of said end-gate and having a downwardly projecting end at the rear, and a jointed brace pivoted to each upper corner of the end-gate and to the downwardly projecting end of each hinge plate, said hinge plates or levers adapted to hook over the end-gate when the latter is folded for locking it closed at the top and pivotally supporting it when swung out at the bottom.

2. An end-gate removably hinged at its lower end to a wagon body, a hinge bar projecting from each side of said end-gate near its upper end, a hinge plate or lever fulcrumed at the top of and within the wagon body on each side of said end-gate and arranged to bear on the top of the rear end of the wagon and extend over it with a downward projection, and a jointed brace pivoted to each hinge bar and to each of said downward projections, said hinge plates or levers upholding the end-gate and pivotally supporting it when swung open at the bottom.

3. An end-gate removably hinged to the bottom of a wagon, a hinge plate or lever pivoted to the top of the wagon on each side of the end-gate, each of said hinge plates having a flat face to bear on the top of the wagon body and a downwardly projecting end extending outside the same, a jointed brace pivoted to the projecting end of each hinge plate and to the side of the end-gate near the top and adapted to fold against the end-gate when the latter is closed at the top, and hang suspended from said hinge plate and support the end-gate when the latter is opened at the bottom.

In testimony that I claim the foregoing as my own, I have hereto affixed my signature in the presence of two witnesses.

CHARLES E. CARROLL.

Witnesses:
ANDREW M. JACKMAN,
MAMIE BOHN.